US010308199B2

(12) United States Patent
Busuioc et al.

(10) Patent No.: US 10,308,199 B2
(45) Date of Patent: Jun. 4, 2019

(54) VEHICLE AND VEHICLE BUMPER

(71) Applicant: FORD MOTOR COMPANY, Dearborn, MI (US)

(72) Inventors: Dan G. Busuioc, Dearborn, MI (US); Bernard Gerard Marchetti, Rochester Hills, MI (US); Timothy R. Beard, Perry, MI (US); Kalyanaraman Bharathan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/725,871

(22) Filed: Oct. 5, 2017

(65) Prior Publication Data
US 2019/0106070 A1    Apr. 11, 2019

(51) Int. Cl.
| | |
|---|---|
| *B60R 19/22* | (2006.01) |
| *B60R 19/24* | (2006.01) |
| *B60R 19/48* | (2006.01) |
| *B60R 19/18* | (2006.01) |
| *B60R 19/50* | (2006.01) |
| *B60R 19/03* | (2006.01) |
| *B60K 11/04* | (2006.01) |

(Continued)

(52) U.S. Cl.
CPC .............. *B60R 19/03* (2013.01); *B60K 11/04* (2013.01); *B60R 19/023* (2013.01); *B60R 19/22* (2013.01); *B60R 19/24* (2013.01); *B60R 19/48* (2013.01); *F02B 29/0425* (2013.01); *B60R 19/483* (2013.01); *B60R 19/50* (2013.01); *B60R 2019/1886* (2013.01); *B60R 2019/505* (2013.01); *F16H 57/0415* (2013.01)

(58) Field of Classification Search
CPC ......... B60R 19/22; B60R 19/18; B60R 19/24; B60R 19/48; B60R 19/483; B60R 19/50; B60R 2019/1886
See application file for complete search history.

(56) References Cited

U.S. PATENT DOCUMENTS 4,386,799 A * 6/1983 Molnar .................. B60R 19/04
293/120
4,457,547 A * 7/1984 Sekiyama ............... B60R 19/18
293/110

(Continued)

FOREIGN PATENT DOCUMENTS

| | | |
|---|---|---|
| DE | 19913080 A1 | 9/2000 |
| EP | 3254905 A1 * | 12/2017 ............. B60R 19/04 |

OTHER PUBLICATIONS

Sopher, "Foamcore blow-molded structural components for transportation applications", Society of Plastics Engineers (SPE), Plastic Research Online, 10.2417/spepro.005893, 3 pages, 2016.

*Primary Examiner* — Gregory A Blankenship
(74) *Attorney, Agent, or Firm* — Raymond Coppiellie; Brooks Kushman, P.C.

(57) ABSTRACT

A vehicle includes a body, a bumper and a plurality of self-tapping fasteners. The body defines mounting orifices. The bumper has an exterior shell that includes an interior wall. The interior wall has receiving portions that protrude inward relative to the shell such that the receiving portions are thicker than adjacent portions of the interior wall. Each of the plurality of self-tapping fasteners extend through one of the orifices and into one of the receiving portions to secure the bumper to the body.

17 Claims, 3 Drawing Sheets

(51) Int. Cl.
*B60R 19/02* (2006.01)
*F02B 29/04* (2006.01)
F16H 57/04 (2010.01)

(56) References Cited

U.S. PATENT DOCUMENTS

| | | | |
|---|---|---|---|
| 4,722,563 A * | 2/1988 | Loren | B60R 19/22 |
| | | | 293/120 |
| 5,545,361 A * | 8/1996 | Rosasco | B29C 44/188 |
| | | | 264/278 |
| 5,658,027 A | 8/1997 | Eissinger et al. | |
| 5,799,991 A | 9/1998 | Glance | |
| 6,551,540 B1 * | 4/2003 | Porter | B29C 45/1635 |
| | | | 264/255 |
| 6,692,064 B1 | 2/2004 | Porter | |
| 7,044,514 B2 | 5/2006 | Mustafa et al. | |
| 2002/0079711 A1 * | 6/2002 | Kajiwara | B60R 19/18 |
| | | | 293/133 |
| 2005/0280269 A1 * | 12/2005 | Evans | B60R 19/18 |
| | | | 293/120 |
| 2007/0222237 A1 * | 9/2007 | Kemp | B60R 19/48 |
| | | | 293/112 |
| 2008/0048462 A1 | 2/2008 | Zabik | |
| 2011/0175380 A1 * | 7/2011 | Kamiya | B60R 19/023 |
| | | | 293/133 |
| 2012/0286529 A1 * | 11/2012 | Gukkenberger | B60R 19/18 |
| | | | 293/132 |
| 2013/0181463 A1 * | 7/2013 | Yamaguchi | B60R 19/18 |
| | | | 293/120 |
| 2016/0159300 A1 * | 6/2016 | Matecki | B23P 15/00 |
| | | | 293/120 |
| 2018/0162302 A1 * | 6/2018 | Kitakata | B60R 19/18 |
| 2018/0208138 A1 * | 7/2018 | Wakabayashi | G01L 5/00 |

* cited by examiner

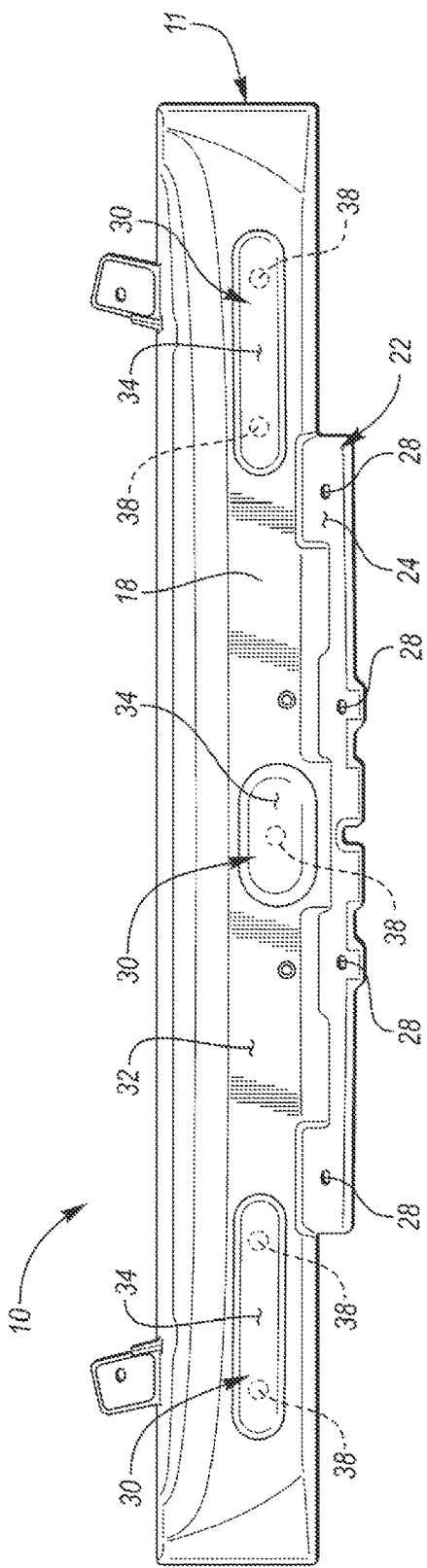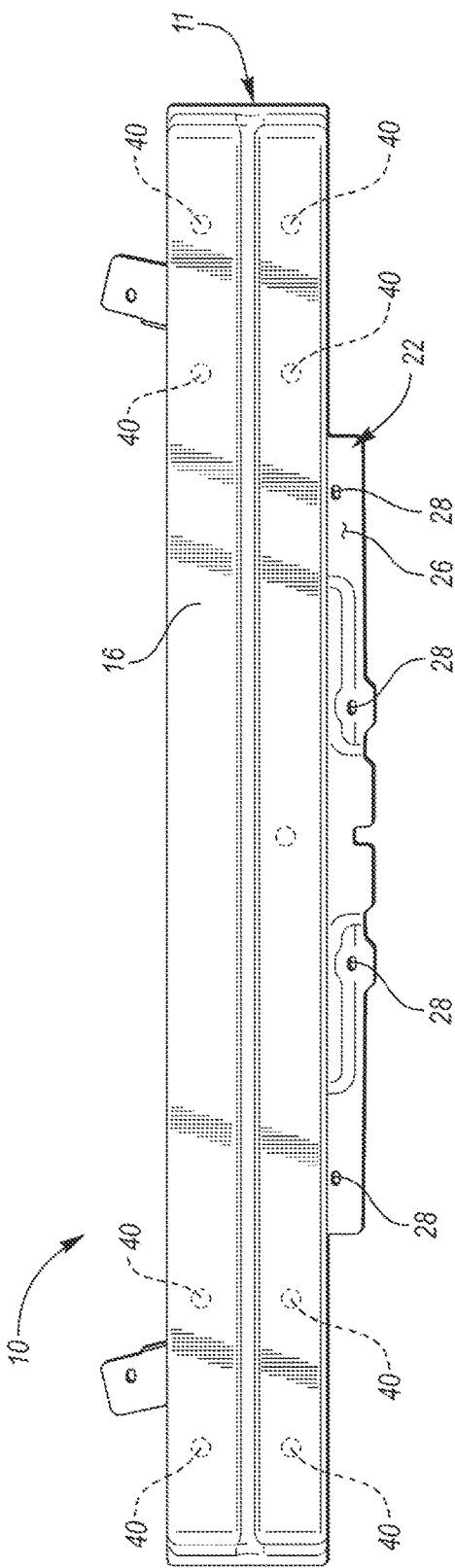
FIG. 1
FIG. 2

US 10,308,199 B2

VEHICLE AND VEHICLE BUMPER

TECHNICAL FIELD

The present disclosure relates to vehicle body components and/or vehicle frame components.

BACKGROUND

The mass of vehicle body and frame components may be reduced to increase fuel economy. It is desirable to increase the fuel economy of a vehicle to comply with the fuel economy targets from government regulation (i.e., the "Cafe" standards) and to increase customer satisfaction.

SUMMARY

A vehicle includes a body, a bumper, and a plurality of self-tapping fasteners. The body defines mounting orifices. The bumper has an exterior shell that includes an interior wall. The interior wall has receiving portions that protrude inward relative to the shell such that the receiving portions are thicker than adjacent portions of the interior wall. Each of the plurality of self-tapping fasteners extend through one of the orifices and into one of the receiving portions to secure the bumper to the body.

A vehicle bumper includes a shell and a flange. The shell has upper, lower, interior, and exterior walls. The flange protrudes downward from the lower wall. The flange has forward and rearward facing surfaces. The flange defines a plurality of orifices that extend through the flange from the forward to the rearward facing surface. The orifices are configured to receive fasteners.

A vehicle bumper includes a fiber-reinforced plastic shell and a structural foam. The fiber-reinforced plastic shell has upper, lower, interior, and exterior walls that define a cavity therebetween. The exterior wall includes an outer surface, a recessed surface extending into the cavity relative to the outer surface, and a peripheral surface extending between the outer and recessed surfaces. The structural foam is disposed within and fills the cavity.

BRIEF DESCRIPTION OF THE DRAWINGS

FIG. 1 is a front view of a vehicle bumper;

FIG. 2 is a rear view of the vehicle bumper;

DETAILED DESCRIPTION

Figure 3:
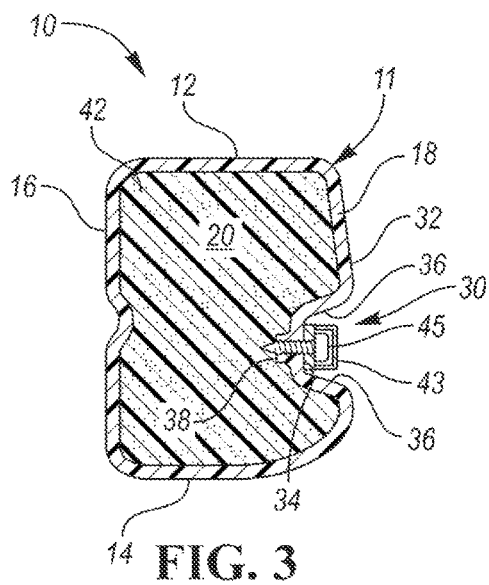
FIG. 3 is a cross-sectional view taken along line 3-3 in FIG. 5.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIGS. 1-4, a front view, a rear view, a first cross-sectional view, and a second cross-sectional view, of a vehicle bumper 10 are illustrated, respectively. The vehicle bumper 10 includes an exterior shell 11 that has an upper wall 12, a lower wall 14, an interior wall 16, and an exterior wall 18. The upper wall 12, lower wall 14, interior wall 16, and exterior wall 18 define a cavity 20 therebetween. The vehicle bumper 10 includes a flange 22 the protrudes downward from the lower wall 14. The flange 22 includes a forward facing surface 24 and a rearward facing surface 26. The flange 22 defines a plurality of orifices 28 (or apertures) that extend through the flange 22 from the forward facing surface 24 to the rearward facing surface 26. The plurality of orifices 28 may be configured to receive fasteners for mounting various vehicle components to the flange 22.

The exterior wall 18 of the vehicle bumper 10 may define one or more pockets 30 that protrude inward from an outer surface 32 of the exterior wall 18 to recessed surfaces 34 of the exterior wall 18 such that the recessed surfaces 34 extend into the cavity 20 relative to the outer surface 32. A peripheral surface 36 extends between the outer surface 32 and recessed surfaces 34 of each pocket 30. The exterior wall 18 may include one or more receiving portions 38 that protrude inward relative to the shell 11 from the recessed surfaces 34 such that the receiving portions 38 are thicker than adjacent portions of the exterior wall 18. The receiving portions 38 may be configured to receive self-tapping or self-piercing fasteners. Markers or slight indentations may be included on the recessed surfaces 34 to indicate the locations of the receiving portions 38.

The interior wall 16 of vehicle bumper 10 may also include one or more receiving portions 40 that protrude inward relative to the shell 11 such that the receiving portions 40 are thicker than adjacent portions of the interior wall 16. The receiving portions 40 may also be configured to receive self-tapping or self-piercing fasteners. The receiving portions 40 may be arranged in a pattern on the interior wall 16 such that the receiving portions 40 are configured to align with mounting orifices defined by vehicle body components that are configured to mate with the vehicle bumper 10. Markers or slight indentations may be included on the external surface of the interior wall 16 to indicate the locations of the receiving portions 40.

Vehicle body components may include various components of the vehicle's body-in-white or frame structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other a welding process or by fasteners, such as rivets, screws, bolts, or any other type of faster known to a person of ordinary skill in the art.

The shell 11 of the bumper 10 may be made from a molding process such as blow molding. The shell 11 of the bumper 10, including the upper wall 12, lower wall 14, interior wall 16, exterior wall 18, and flange 22, may be made from a fiber-reinforced plastic. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinylester, polyester thermosetting plastic, phenol formaldehyde resin, nylon, or other appropriate polymer or plastic. Fiber-reinforced plastics may also be heat and/or pressure cured.

A structural foam 42 may be disposed within cavity 20 between the upper wall 12, lower wall 14, interior wall 16, and exterior wall 18 such that cavity 20 is completely filled with the structural foam 42. Structural foams may include, but are not limited to, EPP (expanded poly-propylene), EPS (expanded poly-styrene), poly-styrene and polyolefin hybrid foam, any variety of two-part chemical foams, and/or any mixture thereof. The density of these foams can be adjusted to provide varying/customizable levels of energy absorption.

Figure 5:
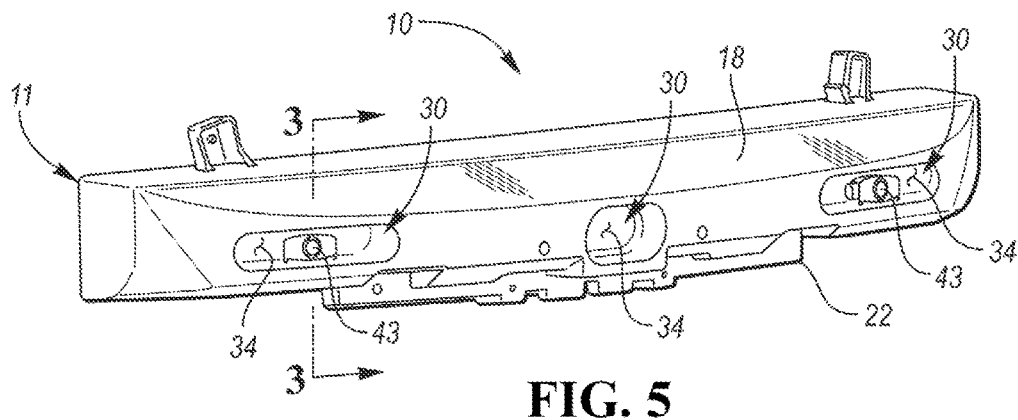
FIG. 5 is a front isometric view of the bumper having an electronic sensing device secured thereto.

Referring to FIGS. 5 and 3, a front isometric view of the bumper 10 having electronic devices 43 secured thereto and a cross-sectional view taken along line 3-3 in FIG. 5 are illustrated, respectively. The electronic devices 43 may be disposed within the pockets 30 and secured to the recessed surfaces 34 within the pockets 30. The electronic devices 43 may be secured to the recessed surfaces 34 by an adhesive or by fasteners 45. More specifically, the fasteners 45 that may secure the electronic devices 43 to the recessed surfaces 34 may be self-tapping or self-piercing fasteners that engage a mounting feature (e.g., a through hole) on the electronic devices 43 and the receiving portions 38 that protrude inward relative to the shell 11 from the recessed surfaces 34. The electronic devices 43 may be lighting devices (e.g., light emitting diodes or incandescent bulbs), antennas (e.g., an adaptive cruise control antenna), cameras (which may be used for self-guiding or autonomous vehicles), or sensors (e.g., sonar, infrared, or radar sensors for detecting objects within the path of the vehicle).

Figure 6:
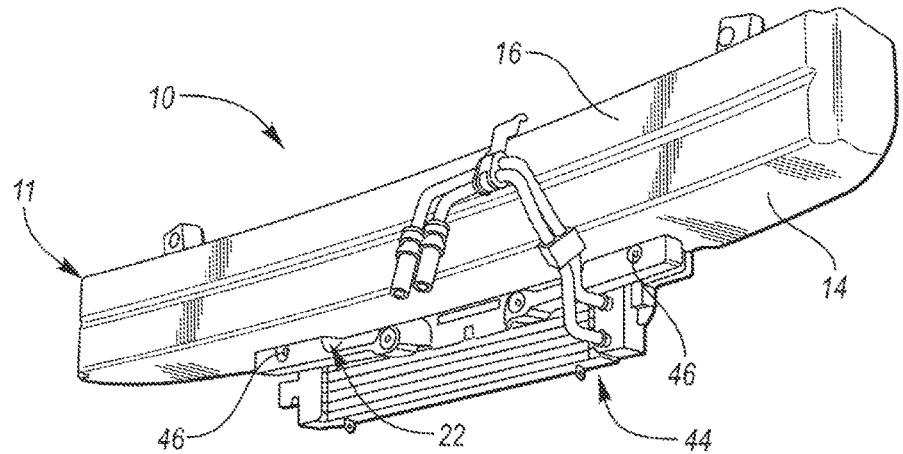
FIG. 6 is a rear isometric view of the bumper having a heat exchanger secured thereto.

Referring to FIG. 6, a rear isometric view of the bumper 10 having a heat exchanger 44 secured thereto is illustrated. More specifically, the heat exchanger 44 may be secured to the flange 22 of the bumper 10 by a set of fasteners 46 that engage the heat exchanger 44 (or more specifically mounting features such as through holes defined by brackets that extend from the heat exchanger 44) and extend through the plurality of orifices 28 defined by the flange 22. The heat exchanger 44 could be a transmission oil cooler, an intercooler (for turbo or super chargers), or any other type of heat exchanger that may be used in a vehicle.

Alternatively, as opposed to the heat exchanger 44, other vehicle components may be secured to the flange 22 of the bumper 10 by a set of fasteners that engage the specific component (or a mounting features of the component) and extend through the plurality of orifices 28 defined by the flange 22. For example, other components that may be secured to the flange 22 include, but are not limited to, lighting devices (e.g., light emitting diodes or incandescent bulbs), antennas (e.g., an adaptive cruise control antenna), cameras, or sensors (e.g., sonar, infrared, or radar sensors for detecting objects within the path of the vehicle).

Figure 4:
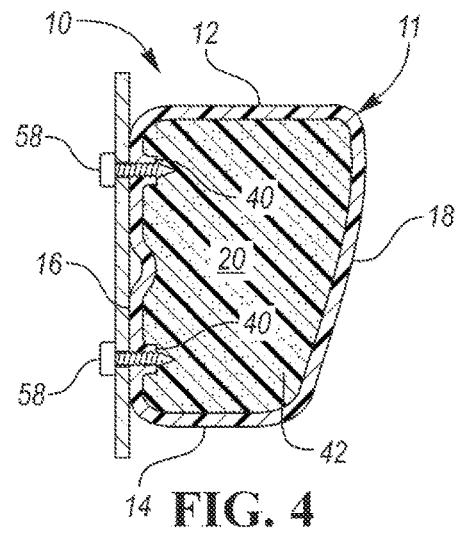
FIG. 4 is a cross-sectional view taken along line 4-4 in FIG. 7.
Figure 7:
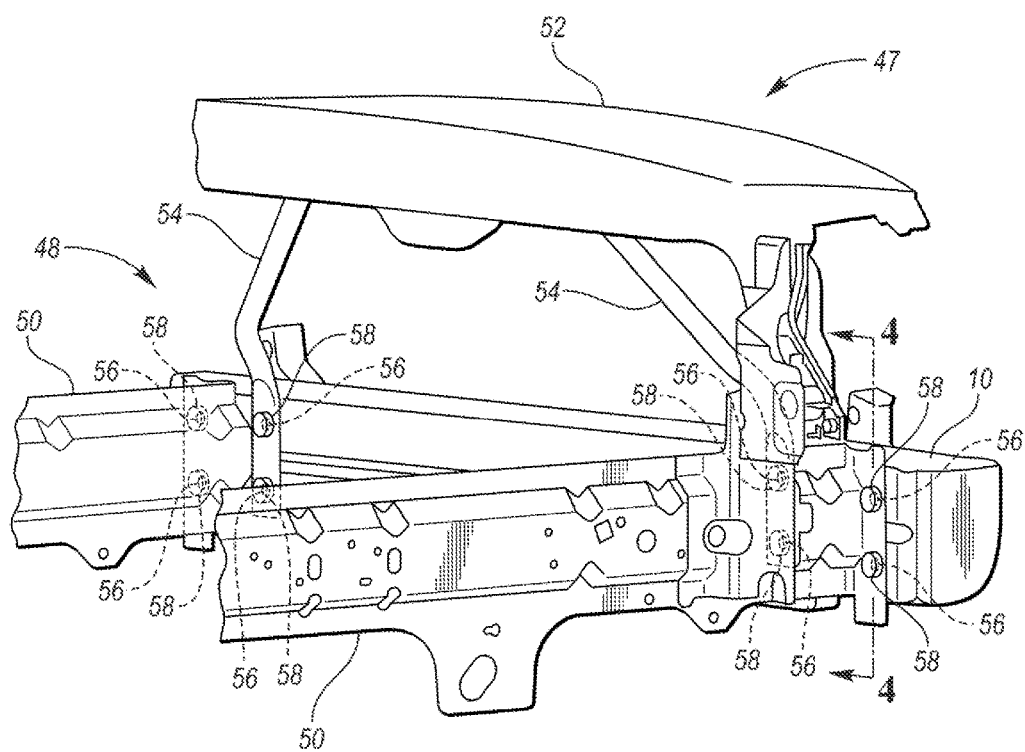
FIG. 7 is a partial view of a vehicle and more specifically a portion of vehicle body that includes the bumper.

Referring to FIGS. 7 and 4, a partial view of a vehicle 47, which specifically includes a portion of a vehicle body 48 that includes the bumper 10, and a cross-sectional view taken along line 4-4 in FIG. 7 are illustrated, respectively. The vehicle body 48 also includes front rails 50, an upper reinforcement of the radiator grill 52, and radiator grill opening reinforcement brackets 54. The vehicle body 48 may define mounting orifices 56 that are configured to receive fasteners 58 to mount the bumper 10 to the vehicle body 48. More specifically, the front rails 50 and the radiator grill opening reinforcement brackets 54 may define the mounting orifices 56. The mounting orifices 56 may be arranged in a pattern that matches the pattern of the receiving portions 40 of the bumper, such that the fasteners 58 may extend through the mounting orifices 56 and into the receiving portions 40 to secure the bumper 10 to the vehicle body 48. The fasteners 58 may be self-tapping or self-piercing fasteners that are configured to extend into the receiving portions 40.

Alternatively, the fasteners 58 may be integral to the bumper 10. More specifically, the interior wall 16 of the bumper 10 may be overmolded onto the fasteners 58 such that the fasteners 58 extend outward relative to the shell 11 of the bumper 10. In the alternative embodiment, the fasteners 58 may be arranged in a pattern along the interior wall 16 of the bumper such that the fasteners are configured to align with the mounting orifices 56 defined by the vehicle body 48. The fasteners in the alternative embodiment may be rivets, a nut and bolt combination, or any other type of fastener or joining method known in the art.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a body defining mounting orifices;
    a bumper having an exterior shell that includes an interior wall, the interior wall having receiving portions that protrude inward relative to the shell such that the receiving portions are thicker than adjacent portions of the interior wall; and
    a plurality of self-tapping fasteners, each extending through one of the orifices and into one of the receiving portions to secure the bumper to the body.

2. The vehicle of claim 1, wherein the shell includes an exterior wall opposite the interior wall, the exterior wall defining a pocket that protrudes inward from an outer surface of the exterior wall to a recessed surface of the exterior wall.

3. The vehicle of claim 2 further comprising an electronic sensing device, and wherein the electronic sensing device is disposed within the pocket and secured to the recessed surface of the exterior wall.

4. The vehicle of claim 1, wherein the shell includes a lower wall and a flange protruding downward from the lower wall, the flange having forward and rearward facing surfaces and defining a plurality of apertures that extend through the flange from the forward to the rearward facing surface.

5. The vehicle of claim 4 further comprising a heat exchanger, and wherein the heat exchanger is secured to the flange by a second set of fasteners that engage the heat exchanger and extend through the plurality of apertures.

6. The vehicle of claim 1, wherein the exterior shell is comprised of fiber-reinforced plastic.

7. The vehicle of claim 6, wherein a structural foam is disposed within the exterior shell.

8. A vehicle bumper comprising:
a shell having upper, lower, interior, and exterior walls; and
a flange protruding downward from the lower wall, the flange having forward and rearward facing surfaces and defining a plurality of orifices that extend through the flange from the forward to the rearward facing surface, wherein the orifices are configured to receive fasteners, and wherein the exterior wall includes a receiving portion that protrudes inward relative to the shell from the recessed surface such that the receiving portion is thicker than adjacent portions of the exterior wall, and wherein the receiving portion is configured to receive self-tapping fasteners.

9. The bumper of claim 8, wherein the exterior wall defines a pocket that protrudes inward from an outer surface of the exterior wall to a recessed surface of the exterior wall.

10. The bumper of claim 8, wherein the interior wall includes receiving portions that protrude inward relative to the shell such that the receiving portions are thicker than adjacent portions of the interior wall, and wherein the receiving portions are configured to receive self-tapping fasteners.

11. The bumper of claim 10, wherein the receiving portions are arranged in a pattern on the interior wall such that receiving portions are configured to align with mounting orifices defined by mating vehicle body components.

12. The bumper of claim 8, wherein the shell and the flange are comprised of fiber-reinforced plastic.

13. The bumper of claim 12, wherein a structural foam is disposed between the upper, lower, interior, and exterior walls.

14. A vehicle bumper comprising:
a fiber-reinforced plastic shell having upper, lower, interior, and exterior walls defining a cavity therebetween, the exterior wall including an outer surface, a recessed surface extending into the cavity relative to the outer surface, and a peripheral surface extending between the outer and recessed surfaces, wherein the interior wall includes receiving portions that protrude inward relative to the shell such that the receiving portions are thicker than adjacent portions the of interior wall, and wherein the receiving portions are configured to receive self-tapping fasteners, and wherein the receiving portions are arranged in a pattern on the interior wall such that the receiving portions are configured to align with mounting orifices defined by mating vehicle body components; and
a structural foam is disposed within and filling the cavity.

15. The bumper of claim 14, wherein the exterior wall includes a receiving portion that protrudes inward relative to the shell from the recessed surface such that the receiving portion is thicker than adjacent portions of the exterior wall, and wherein the receiving portion is configured to receive self-tapping fasteners.

16. The bumper of claim 14 further comprising a flange protruding downward from the lower wall, the flange having forward and rearward facing surfaces and defining a plurality of orifices that extend through the flange from the forward to the rearward facing surface, wherein the orifices are configured to receive fasteners.

17. The bumper of claim 16, wherein the flange is comprised of fiber-reinforced plastic.

* * * * *